March 11, 1958  R. L. McILVAINE  2,826,264
FLUE GAS PURIFICATION SYSTEM
Filed June 25, 1956
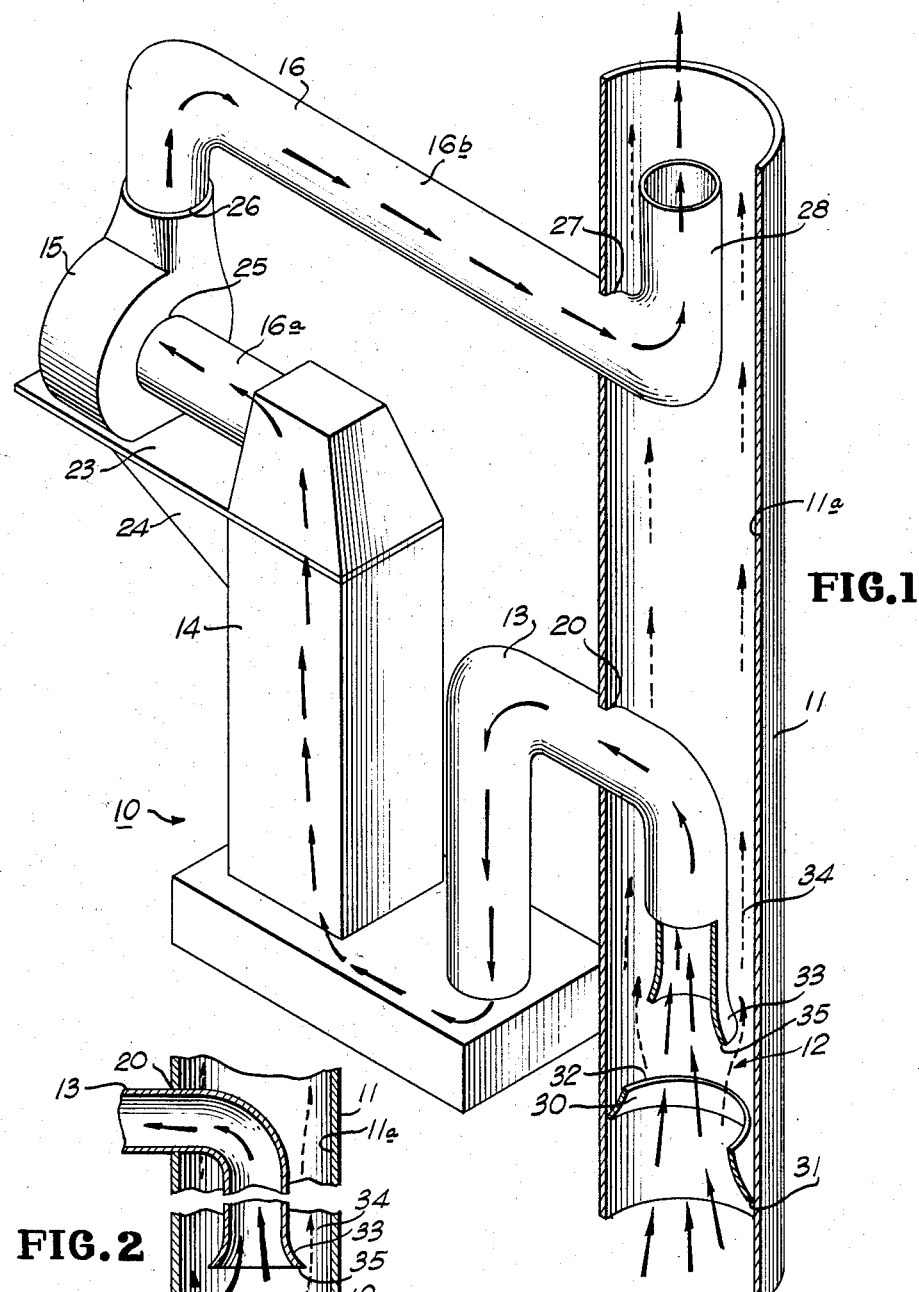
Inventor
ROBERT L. McILVAINE
by
Mason, Kolehmainen, Rathburn and Wyss.
Attorneys

United States Patent Office 2,826,264
Patented Mar. 11, 1958

2,826,264
FLUE GAS PURIFICATION SYSTEM

Robert L. McIlvaine, Winnetka, Ill., assignor to Herbert Simpson Corporation, Chicago, Ill., a corporation of Illinois Application June 25, 1956, Serial No. 593,714

1 Claim. (Cl. 183—37)

The present invention relates to a flue gas purification system and, more particularly, to a new and improved apparatus for removing contaminated flue gases from a flue without backing up the flue gases in the event of equipment failure.

Due to the increased concern for contamination of the atmosphere by exhaust gases from domestic and commercial incinerators, the problem of withdrawing contaminated flue gases from an incinerator flue, scrubbing them by means of an air or gas purifier, and then returning the decontaminated or purified flue gases to the incinerator flue for discharge to the atmosphere has become more critical. An attempt to solve this problem has been made by many of the prior art devices. Several of these devices have embodied various types of damper or baffle arrangements which are movable to obstruct the normal flow of gas in the flue and to divert the contaminated flue gas to a gas purification system. There are several disadvantages inherent in these systems. First, the baffle or damper is subject to the accumulation of solid matter, and especially oxidized particles, with the result that it may become immobilized or fused to the inner wall of the flue whereupon flue gases will be backed up in the event of failure of the purification equipment, with, of course, the attendant expulsion of fumes and smoke through the loading ports of the incinerator. In many of these systems safety devices have been suggested for moving the dampers or baffles to an inoperative position upon failure of the equipment of the flue gas purification system. In the latter systems, there is introduced, in addition to the possibility of an operational failure of the baffle or damper itself, the second possibility of operational breakdown of the safety device which may also result in back-up of the contaminated flue gases.

It would therefore be desirable to provide a flue gas purification system having neither movable component parts nor safety device control apparatus associated therewith subject to the described operational failures and the provision of such a system constitutes one of the primary objects of the present invention.

It is another object of the present invention to provide a flue gas purification system embodying a flue gas siphon for withdrawing contaminated fluids from a flue.

Another object of the present invention is to provide a flue gas purification system embodying a flue gas siphon for removing the contaminated fluids from a flue during operation of the system and for permitting passage of the contaminated fluids along the flue in the event of operational failure of the purification system.

Still a further object of the present invention is to provide a flue gas purification system in which the possibility of back-up of contaminated fluids into the incinerator or the like upon equipment failure is entirely obviated.

Other objects and advantages of the present invention will become apparent in the following description of an illustrative embodiment thereof, in the course of which reference is had to the accompanying drawings wherein:

Fig. 1 is a perspective view, shown partially in section, of a flue gas purification system employing a flue gas siphon and embodying the principles of the present invention; and Fig. 2 is a sectional view of the flue gas siphon used in the equipment illustrated in Fig. 1.

The aforementioned and other objects are realized by providing a flue gas purification system utilizing a flue gas siphon for withdrawing contaminated fluids or gases from the flue of an incinerator or the like and directing the contaminated flue gases into a purification system for removing the contaminated particles and exhausting cleansed gases back into the flue. More specifically, the flue gas siphon comprises means enclosed within the incinerator flue for constricting and directing the flow of contaminated fluids at an increased velocity into a siphon conduit likewise disposed within said flue and in communication with the purification system. The construction of the gas siphon is such that the contaminated flue gases are drawn into the purification system during operation of the latter, but are permitted to by-pass the siphon conduit in the event of inoperativeness of the purification system equipment, thereby eliminating the possibility of back-up of contaminated flue gases into the incinerator with the attendant undesirable consequences.

Briefly, and referring now specifically to Fig. 1 of the drawing, there is illustrated a flue gas purification system 10 shown as used with an incinerator flue 11 having its lower end communicating with an incinerator or the like (not shown) in order to receive the upward flow of heated contaminated fluids or flue gases. A flue gas siphon, generally indicated as 12, is employed to direct the flue gases at an increased velocity through suitable gas collecting means in the form of a conduit 13 emptying into an air-gas scrubber 14 where the contaminated flue gases are purified. The purified gases discharged from the scrubber 14 are then passed back into the flue 11 for exhaustion to the atmosphere. By virtue of the flue gas siphon construction, described in greater detail below, the flue gases, upon failure of the equipment within the purification system, may by-pass the conduit 13 and continue to travel through the flue 11 for exhaustion to the atmosphere, whereby the possibility of back-up of the contaminated flue gases into the incinerator is entirely eliminated, although neither moving component parts nor safety devices are utilized.

The flue 11 is of conventional construction and may be formed of generally flexible and cylindrical metal duct material having thin walls 11a. The lower end of the flue 11 is frequently attached to the dome or upper portion of an incinerator (not shown) so that the contaminated air and gas are impelled under the influence of thermal forces generated by burning of refuse or the like into the flue. The gases flowing into the lower end of the flue are directed, as previously mentioned, by the gas siphon 12 into the purification system via the conduit 13 prior to exhaustion to the atmosphere. The latter conduit has a generally U-shaped configuration, one arm of which is opened at its lower end and is disposed longitudinally and centrally within the flue 11, and the bight portion of which extends through an aperture 20 defined in the wall of the flue 11. The other arm of the conduit 13 is attached to and is in fluid communication with a base 21 of the air-gas scrubber 14. The base 21 provides a fluid communication between the conduit 13 and a housing 22 of the air-gas scrubber 14, which housing is supported on the base 21 and encloses suitable filtering equipment adapted to purify the contaminated flue gases.

In order to facilitate the flow of contaminated flue gases from the flue 11 through the conduit 13 and the air-gas scrubber 14, there is provided a conventional exhaust fan 15. This fan is disposed within the conduit 16 and mounted on a table 23 supported from the housing 22 by a supporting arm 24. More particularly, the inlet 25 of the exhaust fan 15 is connected by suitable means to section 16a of the conduit 16, thereby providing fluid communication with the outlet of the scrubber 14 so as to create a suction within the conduit section 16a, the scrubber 14 and the conduit 13. An outlet 26 of the fan 15 is connected to a generally Z-shaped section 16b which provides a passageway for the return of the purified gases to the flue 11. The central portion of the conduit 16b passes through an aperture 27 in the wall of the flue and connects with an upwardly extending, open ended leg 28 supported centrally of the flue. By this arrangement, it will be readily appreciated that during normal operation of the flue gas purification system the contaminated flue gases are drawn into the conduit 13 due to the combined action of the flue gas siphon 12 and the fan 15. Thus, the flue gases flow through the conduit 13, the base 21, the housing 22, the conduit section 16a, the fan 15, and the conduit section 16b back to the flue 11, as indicated in Fig. 1 by the solid line arrows.

In accordance with an important feature of the present invention, the flue gas siphon 12 comprises a venturi tube section 30 fixedly secured along its base portion 31 to the inner wall of the incinerator flue 11 in generally transverse relationship to the longitudinal axis of the incinerator flue. The venturi tube section 30 has a configuration typical of all venturis and includes an ejection mouth 32, clearly shown in Fig. 2. The venturi tube functions to constrict and accelerate the flow of flue gases and direct them toward the center of the flue 11, the upward flow of the flue gases through the venturi section being clearly illustrated by the solid lined arrows in Figs. 1 and 2. To assure high operative efficiency of the siphon 12, the lower end of the conduit 13 is flared downwardly and outwardly to provide a funnel-shaped end portion 33 for receiving and guiding the constricted flue gases into the conduit 13. The brim 35 of the funnel-shaped end portion 33 is appropriately spaced from the mouth 32 of the venturi such that the flue gases are all received within the conduit 13. However, as clearly shown in Fig. 2, the cross sectional area of the brim 35 of the funnel 33 is less than the cross sectional area of the incinerator flue 11, thereby defining a passageway 34 for effectively by-passing the conduit 13 and the entire purification system 10. In this connection, during the normal operation of the system 10, gases do not flow through the by-pass passageway since they are directed by the venturi 30 into the conduit 13 and drawn upwardly by the suction created by the fan 15.

Hence, in accordance with a feature of the present invention, whenever a failure occurs within the system 10 resulting in the obstruction of the passage of flue gases, then the flue gases by-pass the conduit 13 and flow through the passageway 34, as illustrated by broken line arrows in Fig. 2. By this arrangement, the contaminated flue gases continue to flow through the flue 11 and are exhausted to the atmosphere despite inoperativeness of the system 10, whereby the back-up of the flue gases into the incinerator is completely eliminated.

In view of the foregoing description, it will be recognized that the present invention provides a flue gas purification system embodying a flue gas siphon including gas collecting means which employs no mechanically or electrically movable component parts and no safety devices. Thus, the described equipment is capable of diverting contaminated flue gases from a flue to a purification system during normal operation of the equipment and of permitting uninterrupted passage of the contaminated flue gases through the flue when the gas purifying equipment is inoperative.

What is claimed as new and desired to be secured by Letters Patent of the United States is:

A flue gas purification system for use with a flue carrying contaminated gases comprising a cylindrical flue, gas purifying means, an ingress conduit including a conduit section disposed within and extending longitudinally of said flue for transporting said contaminated gases to said purifying means, an egress conduit means in communication with said flue for transporting uncontaminated gases from said purifying means to said flue, means for impelling said contaminated and uncontaminated gases through said system, said ingress conduit section having a flared end portion disposed within said flue for directing gases into said ingress conduit and said end portion having a cross sectional area less than the flue cross sectional area, and a continuous, concavo-convex venturi section having a base portion in gas sealing relation to the inner surface of said flue in fixed position, said venturi section having a continuous ejection mouth of less diameter than the base portion, said brim being spaced below said flared end portion so that said venturi section constricts all of the contaminated gases and directs them into said flared end portion at an increased velocity, whereby said contaminated gases are permitted to pass around said end of said ingress conduit means and to continue along in said flue whenever the purifying means or the impelling means become inoperative.

References Cited in the file of this patent

UNITED STATES PATENTS

| | | |
|---|---|---|
| 162,070 | Humphreys et al. | Apr. 13, 1875 |
| 411,327 | Donnald | Sept. 17, 1889 |
| 640,796 | Neuhs | Jan. 9, 1900 |
| 684,692 | Jarvis | Oct. 15, 1901 |
| 2,086,671 | Hazelton | July 13, 1937 |
| 2,763,337 | Schneible et al. | Sept. 18, 1956 |

FOREIGN PATENTS

| | | |
|---|---|---|
| 16,416 | Great Britain | July 17, 1907 |

U. S. DEPARTMENT OF COMMERCE

PATENT OFFICE

CERTIFICATE OF CORRECTION

Patent No. 2,826,264                               March 11, 1958

Robert L. McIlvaine

It is hereby certified that error appears in the printed specification of the above numbered patent requiring correction and that the said Letters Patent should read as corrected below.

Column 4, line 36, for "brim" read -- ejection mouth --.

Signed and sealed this 20th day of May 1958.

(SEAL)
Attest:

KARL H. AXLINE                                                       ROBERT C. WATSON
Attesting Officer                                         Commissioner of Patents